United States Patent [19]
Chubbuck

[11] Patent Number: 5,615,468
[45] Date of Patent: Apr. 1, 1997

[54] MODULAR MECHANICAL SYSTEM

[76] Inventor: Joseph Chubbuck, 5999 Lower Lawrence St., Rome, N.Y. 13440

[21] Appl. No.: 642,441

[22] Filed: May 3, 1996

[51] Int. Cl.$^6$ .................................................. B23Q 7/02
[52] U.S. Cl. .......................... 29/38 C; 29/563; 29/564; 74/820
[58] Field of Search ........................... 29/563, 564, 33 P, 29/48.5, 38 A, 38 B, 38 C; 74/820, 813 R

[56] References Cited

U.S. PATENT DOCUMENTS

| | | | |
|---|---|---|---|
| 3,257,870 | 6/1966 | Orozco | 74/820 |
| 3,301,097 | 6/1967 | Beman. | |
| 3,718,055 | 2/1973 | Maier | 74/820 X |
| 4,317,385 | 3/1982 | Harvey et al. | 74/820 X |
| 4,512,214 | 4/1985 | Surman | 74/820 |
| 5,090,100 | 2/1992 | Klett et al. | 29/38 C |
| 5,370,519 | 12/1994 | Shapcott | 29/564 X |

Primary Examiner—William R. Briggs
Attorney, Agent, or Firm—Harris Beach & Wilcox, LLP

[57] ABSTRACT

Apparatus for performing a series of operations upon a workpiece that include at least one modular mechanical unit having a worktable for supporting workpieces thereon. The worktable is periodically indexed by a Geneva wheel so that a workpiece on the worktable is intermittently moved through a plurality of work stations positioned about the worktable. A gear drive unit is employed to power the Geneva wheel as well as a movable tool support unit mounted in each of the work stations to move a tool mounted upon said support into and out of contact with a workpiece moved by the worktable into the work station. A number of modular units can be cojoined and arranged to be driven from a common prime mover.

11 Claims, 9 Drawing Sheets

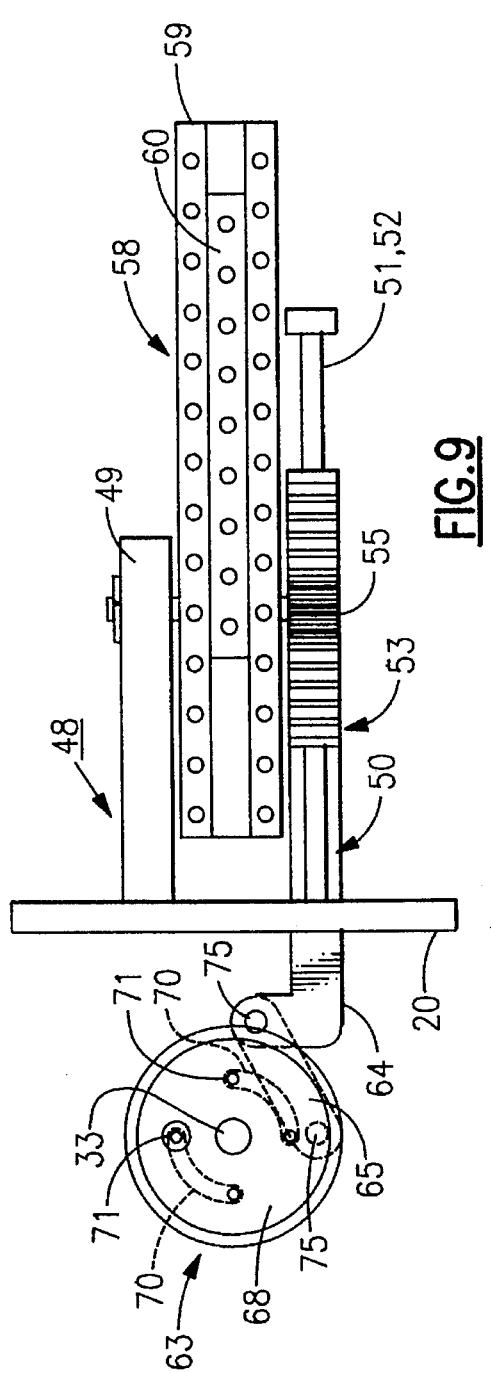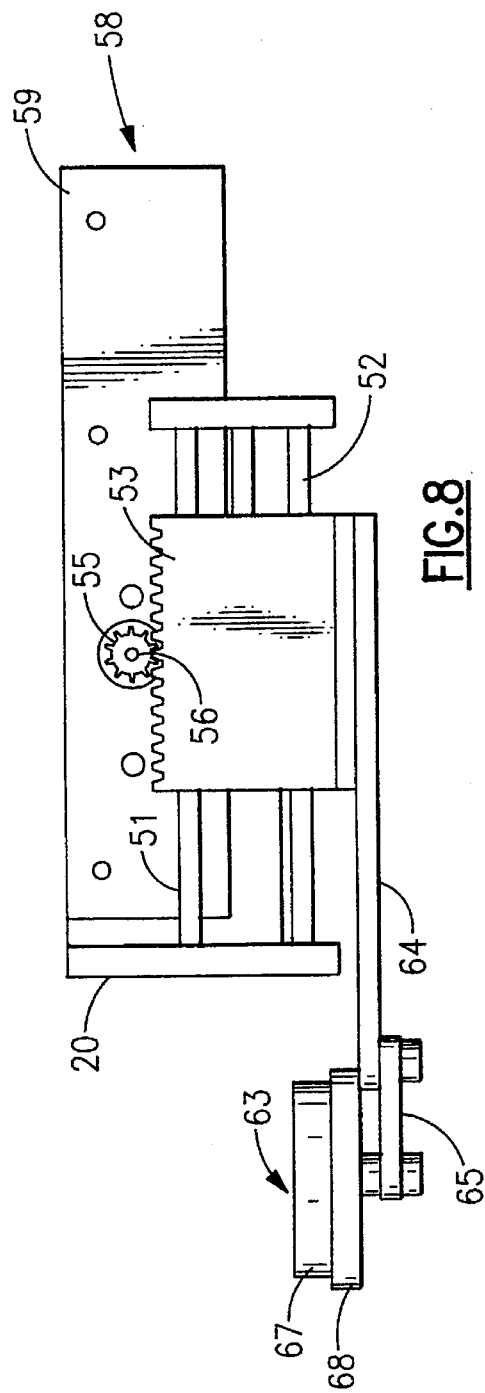

MODULAR MECHANICAL SYSTEM

BACKGROUND OF THE INVENTION

This invention relates to a modular mechanical system for intermittently indexing workpieces seriatim into a plurality of work stations and causing a series of operations to be carried out on the workpieces as they pass through the work stations.

Rapidly changing technology and aggressive competition make it essential for companies to automate manufacturing processes rapidly, more often and more economically than before. Most automated processes today, however, are computer controlled and typically require complex equipment dedicated for carrying out various processing steps. Accordingly, this type of equipment is costly to install, cannot be readily converted to carry out new processes, and the cost of any changeover, if at all possible, is generally relatively high.

Although the use of computerized dedicated machinery has certainly increased modern day productivity, particularly in the case where extended production runs are necessary, there still exists the need for mechanically controlled production equipment that can be easily and readily adapted to carry out certain manufacturing steps in a rapid and highly efficient manner.

SUMMARY OF THE INVENTION

It is a primary object of the present invention to improve mechanically controlled systems for carrying out manufacturing processes.

It is a further object of the present invention to provide a modular mechanical system that can be quickly converted to carry out different manufacturing procedures.

It is a still further object of the present invention to provide a modular mechanically controlled system that will accurately index workpieces between work stations, and in addition cause a tool mounted in the work station to move into and out of a workpiece positioned therein to carry out manufacturing steps.

Another object of the present invention is to provide a simple mechanical drive unit that will control both the indexing of workpieces between work stations as well as controlling the movement of production tools into and out of working contact with the workpieces situated in a plurality of work stations.

These and other objects of the present invention are attained by means of a modular mechanical system for carrying out a series of manufacturing operations upon a plurality of workpieces that includes at least one modular unit having a frame upon which is mounted a rotatable worktable. A Geneva indexing wheel is mounted in the frame and is connected to the worktable to intermittently index the table through a series of work stations. Workpieces are secured to the top of the table at hold-down positions and are moved seriatim through each of the work stations. A primary gear is also mounted in the frame and is arranged to mesh with a plurality of secondary gears that are circumferentially spaced about the primary gear. A prime mover is attached to the main gear for turning both the main gear and the secondary gears meshing therewith at a desired rate. One of the secondary gears is connected to a Geneva driver which is arranged to intermittently advance the Geneva wheel and thus index the worktable. Each secondary gear is operatively connected to a tool holder mounted in one of the work stations to provide motive power for moving a tool into and out of engagement with a workpiece positioned in the work station.

In a further embodiment of the invention, the gears of at least two modular units are interconnected via a gear train so that the worktables of the interconnected units are driven from a common prime mover thereby increasing the capacity of the apparatus and increasing the number of operations that can be performed on a workpiece.

BRIEF DESCRIPTION OF THE DRAWINGS

For further objects of the present invention, reference will be made to the following detailed description of the invention which is to be read in association with the accompanying drawings, wherein:

FIG. 8 is a side view of a work station further illustrating the tool support drive arrangement;

FIG. 9 is a top view of the work station shown in FIG. 8;

DESCRIPTION OF THE INVENTION

Figure 1:
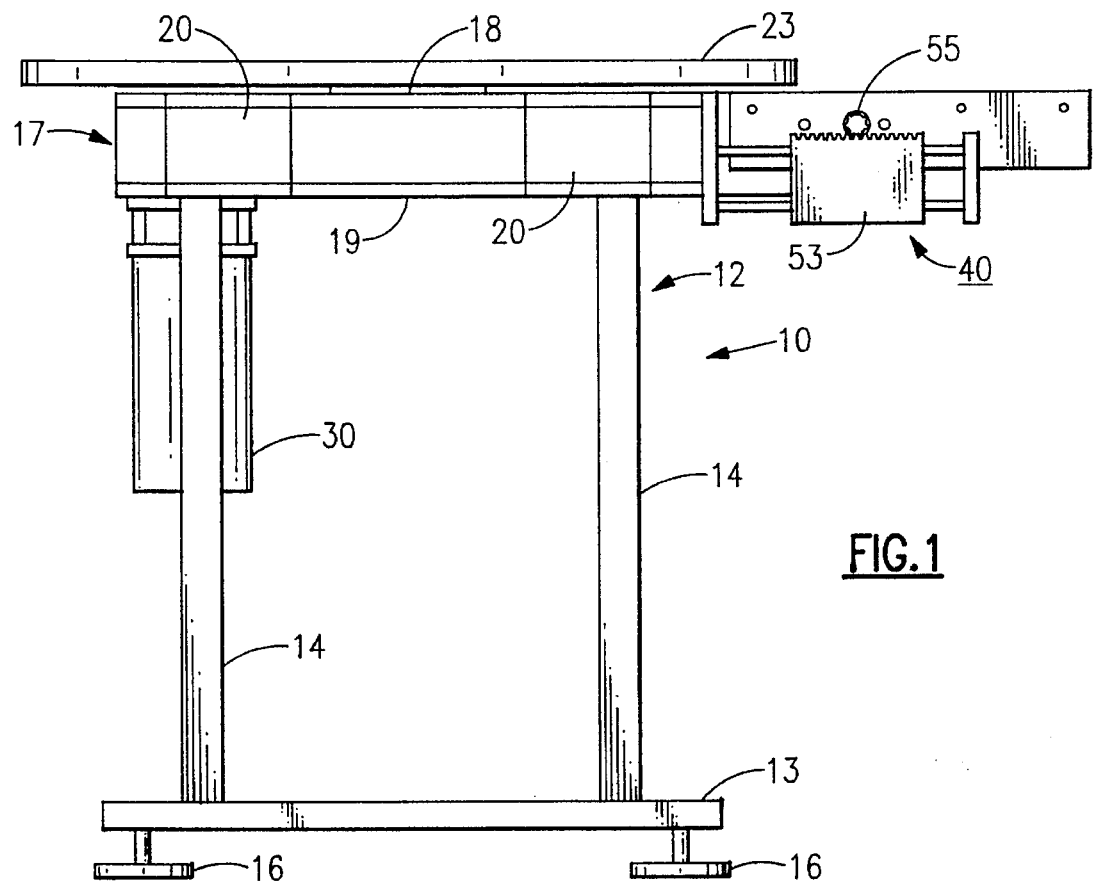
FIG. 1 is a side elevation showing a modular unit embodying the teachings of the present invention.

Referring initially to FIG. 1, there is shown a mechanical modular unit generally referenced 10 which embodies the teachings of the present invention. The modular unit is mounted in a frame 12 having a base 13 in which a series of upraised legs 14—14 are supported. Adjusting pads 16—16 are threaded into the base which permit the modular unit to be easily levelled. A drive housing 17 is supported in the upper part of the frame. Although the drive housing can take almost any shape, the one employed in the present embodiment is octoganal in form. The housing includes an upper plate. 18 and a lower plate 19 that are held together in a spaced apart relationship by means of spacers (not shown). Each side of the housing is closed by side plate 20.

Figures 6, 7:
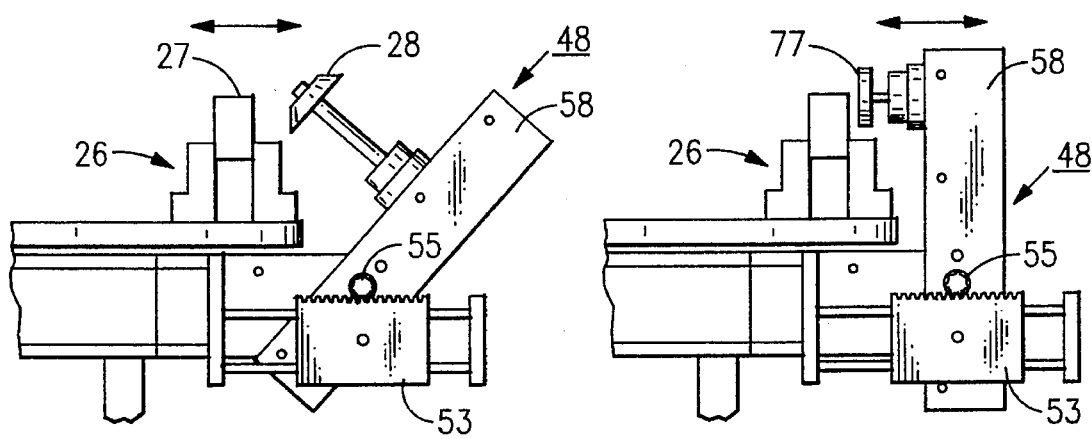
FIG. 6 is an enlarged partial side view of a work station showing the tool support tilted at an angle about 30° with the horizontal plane.
FIG. 7 is a partial side view similar to that of FIG. 7 further showing the tool support tilted at an angle of about 90° with the horizontal plane.
Figure 2:
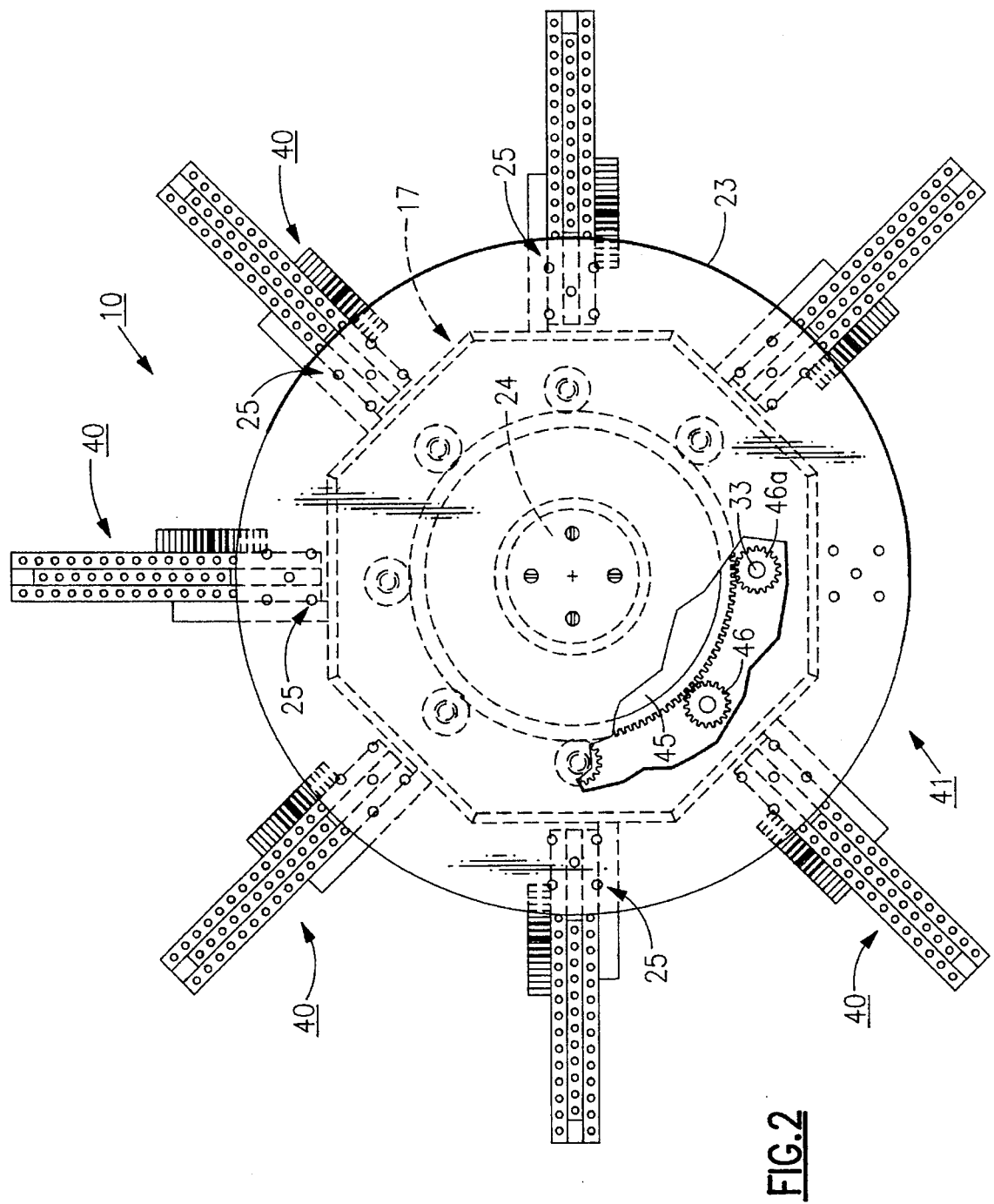
FIG. 2 is a top plane view showing the modular unit shown in FIG. 1.

A worktable 23 is rotatably supported upon a shaft 24 above the top plate of the housing. The worktable contains a series of circumferentially spaced apart hold-down positions 25, each of which is herein defined by a series of bolt holes. As is well known in the art, suitable holding fixtures such as a vice 26, as shown in FIG. 6, can be mounted in each hold-down position for securing a workpiece 27 to the worktable with sufficient force to allow the workpiece to be acted upon by a tool, as for example a grinding wheel 28 as shown in FIG. 6.

Figure 3:
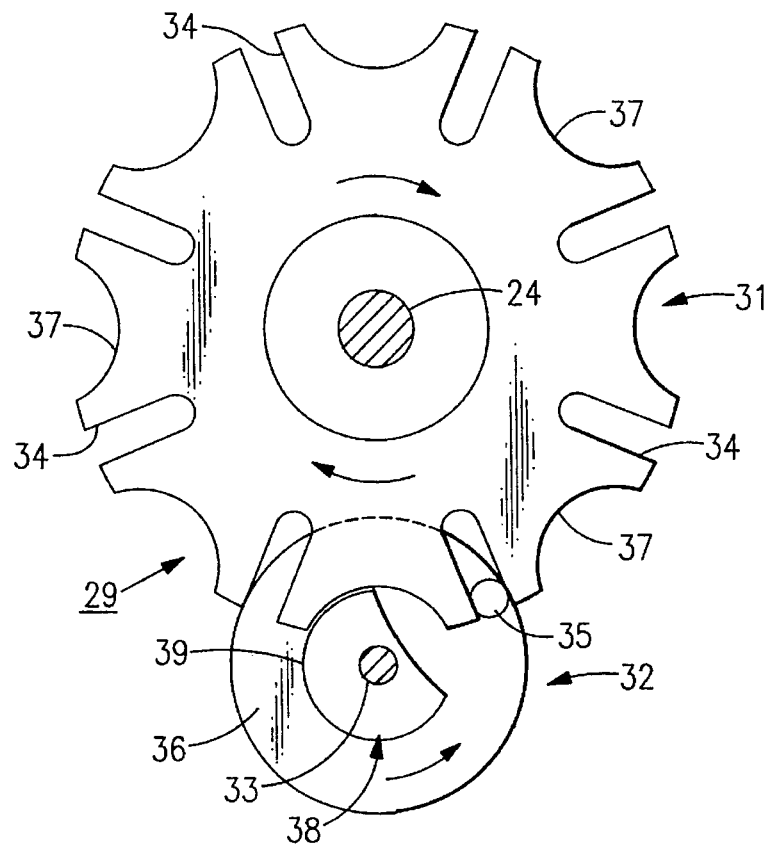
FIG. 3 is a top sectional view showing a Geneva drive unit employed in the present modular unit.

The worktable is connected to a Geneva drive unit 29 (FIG. 3) that is powered by a prime mover which, in this preferred embodiment, is an electric motor 30. The Geneva unit includes a Geneva wheel 31 and a rotatably mounted Geneva driver 32. The driver 32 is keyed directly to the shaft 33 of motor 30. However, it should be evident to one skilled in the art that the motor may be connected to the driver through any suitable means such as a power transmission or the like. The Geneva wheel includes a series of circumferentially spaced radially disposed slots 34—34 that are arranged to engage a raised drive pin 35 mounted upon the Geneva driver base plate 36. An arcuate shaped cutout 37 is formed in the periphery of the Geneva wheel between each of the slots for receiving therein a raised cylindrical segment 38 centrally mounted on the base plate 36 adjacent to drive pin 35.

In operation, as the driver is being turned by the motor, the drive pin engages one of the slots and causes the wheel to turn a given number of degrees whereupon the pin moves out of the slot. The pin continues to rotate out of engagement with the wheel until such time as it again picks up the next adjacent slot. While the drive pin is out of engagement with the wheel, the raised peripheral surface 39 of the cylinder segment rides in contact with the arcuate shaped cutout 37 positioned between the adjacent slots in the wheel thus helping to maintain the wheel and driver in rotational alignment. As can be seen, the Geneva wheel, under the influence of the driver, is intermittently rotated by the driver for a first indexing period and held stationary for a second longer dwell period.

Figure 4:
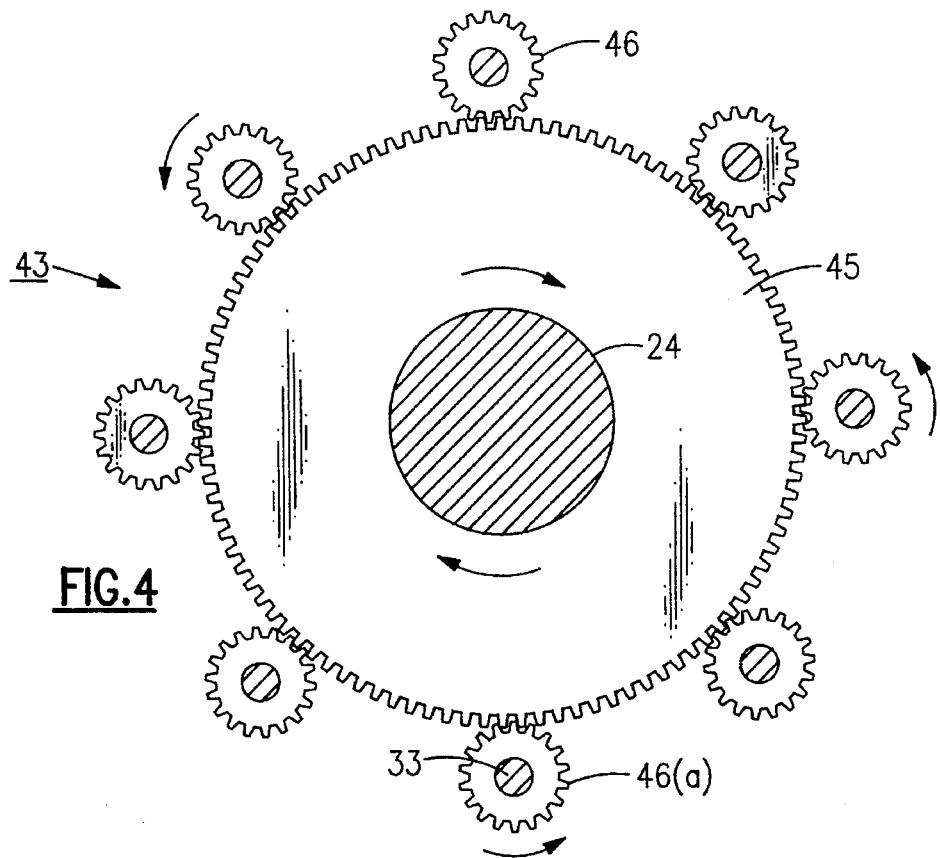
FIG. 4 is a top sectional view showing a gear drive unit utilized in the present modular unit.
Figure 5:
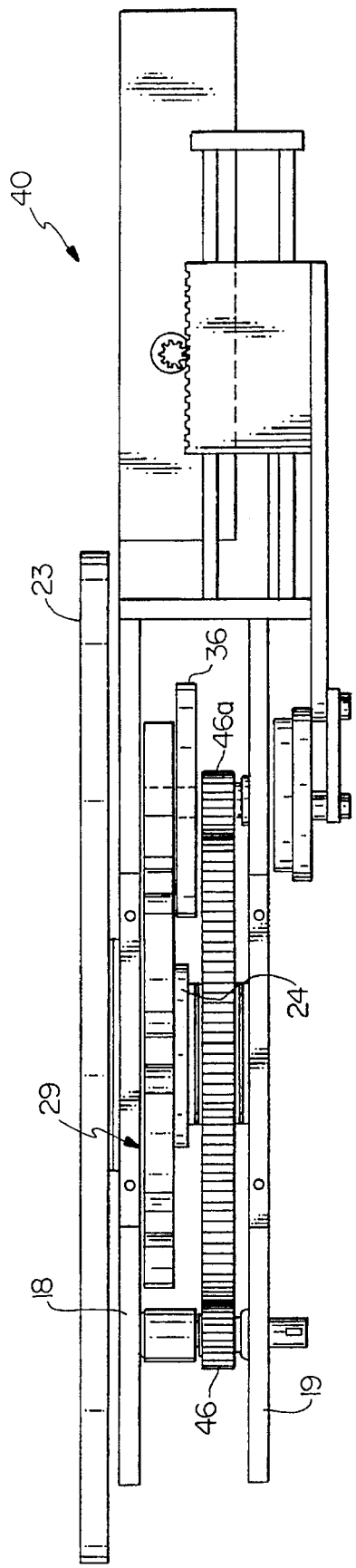
FIG. 5 is a partial side elevation with parts broken away showing one of the modular unit work stations and the tool support mounted therein connected to the drive unit of the present invention.

The worktable 23, which is keyed directly to the Geneva wheel shaft 24, is periodically moved thus indexing the holding hold-down positions and the workpieces supported therein between a series of work stations 40—40. Each workpiece, in turn, is maintained in a stationary condition within a work station during the predetermined dwell period. As will be explained in further detail below, there are seven active work stations 40—40 situated about the work table and one vacant loading and unloading station 41. A gear drive unit generally referenced 43 (FIG. 4), is rotatably mounted upon shaft 24 and includes a primary gear 45 and a series of smaller secondary gears 46—46 that are equally spaced about and in meshing contact with the primary gear. The secondary gears are mounted upon stub shafts 47—47 that are supported in the top and bottom plates of the housing. One of the secondary gears, gear 46(*a*), is keyed to the drive shaft 33 of the motor 30 along with the Geneva driver 32 (FIG. 3) to provide rotational power to the primary gear and thus to the other secondary gears so that they turn in timed relationship with the Geneva wheel.

As further illustrated in FIGS. 5–10, a tool support unit generally referenced 48 is located in each of the active work stations and is arranged to bring a tool mounted therein into and out of operative contact with a workpiece located in the work station during each of the dwell periods. Each tool support unit is mounted upon a side wall 20 of the drive housing 17 (FIG. 1) and contains a horizontally disposed mounting bracket 49. Guide rails are also mounted upon the side wall 20 and includes an upper rail 51 and a lower rail 52 that are adapted to slidably support a rack 53 (FIG. 8) therebetween. The rack 53 meshes with a pinion 55 which, in turn, is supported in mounting bracket 49 by means of pinion shaft 56. A slide assembly 58 is rotatably supported upon the pinion shaft so that the entire slide assembly can be tilted to an infinite number of positions between a full vertical position as shown in FIG. 7 and a full horizontal position as shown in FIG. 8.

Figure 10:
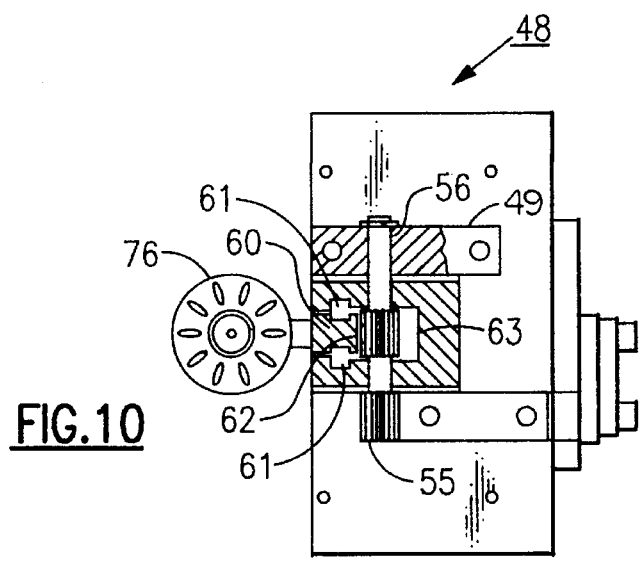
FIG. 10 is an end view in partial section of the work station shown in FIG. 9.

Each slide assembly 58 includes a U-shaped saddle 59 (FIG. 9) which is mounted upon pinion shaft 56 and which slidably contains a tool holder 60 in bearings 61—61 (FIG. 10). As illustrated in FIG. 10, the tool holder linear gear 62 that runs along its bottom surface that is in meshing contact with a gear 63 which turns with the pinion shaft. As best shown in FIG. 9, rack 53 is coupled to the motor drive shaft 33 by means of a four bar linkage that includes a hub 63, a drive arm 64 and a connecting link 65. The hub 63 includes a back plate 67 that is secured for rotation to the motor shaft by any suitable means and a rotor 68. A pair of arcuate shaped slots 70—70 are formed in the rotor which are adapted to slidably receive pins 71—71 staked in the back plate. The slots serve as lost motion devices to interrupt the movement of the tool holder as the worktable is being indexed. The link 65 is connected to the drive arm 64 and the rotor 68 by pins 75—75. The drive arm, in turn, is pinned to rack 53 whereby the rack is reciprocated along the rails 51–52 in timed relation with the motor speed. In practice, the slidably mounted tool holder, acting through the gearing arrangement and the four bar linkage, is moved toward and away from a workpiece in the associated hold-down station during each dwell period.

Figure 11:
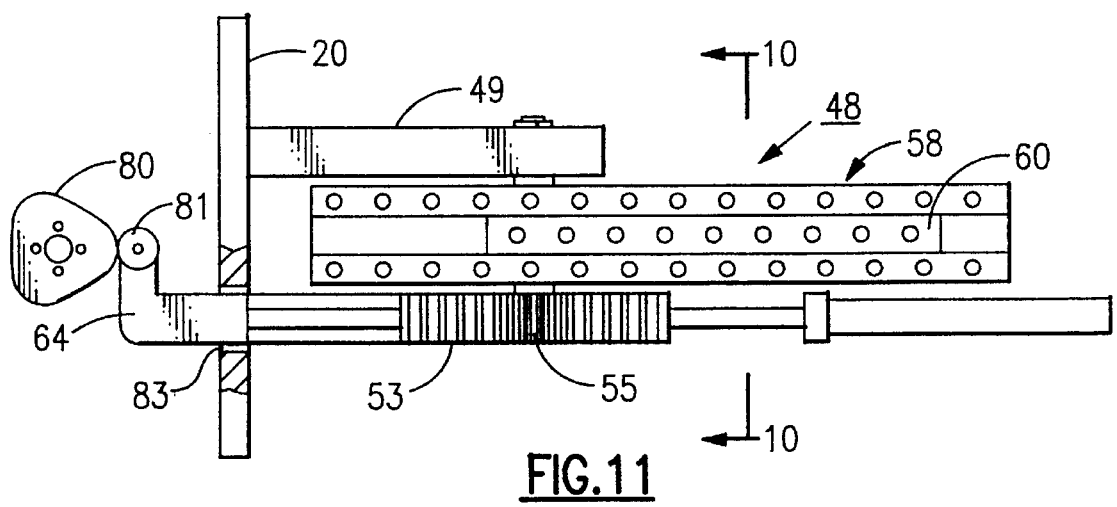
FIG. 11 is a top view illustrating a further embodiment of the tool support drive arrangement.

Any suitable production tool, such as drill 76 shown in FIG. 10 or the grinding wheels 28 and 77 as shown in FIGS. 6 and 7, respectively, may be secured to the slide member so that the tool is driven into the work and then retracted during a dwell period prior to the workpiece being indexed into the next station. Although a four bar linkage is shown in the preferred embodiment of the invention, any other suitable drive mechanism may be utilized to reciprocate the rack along the guide rails without departing from the teachings of the present invention. As shown in FIG. 11, the four bar linkage may be replaced by a camming mechanism that includes a cam 80 that is mounted on motor shaft 33 and a cam follower 81 mounted on the drive arm 64. In this embodiment, the drive arm is slidably carried in a guideway 83 associated with the drive housing side wall 20. The cam profile is contoured to control the stroke of the rack so that the production tool can complete a desired operation during a preprogrammed dwell period.

Figure 12:
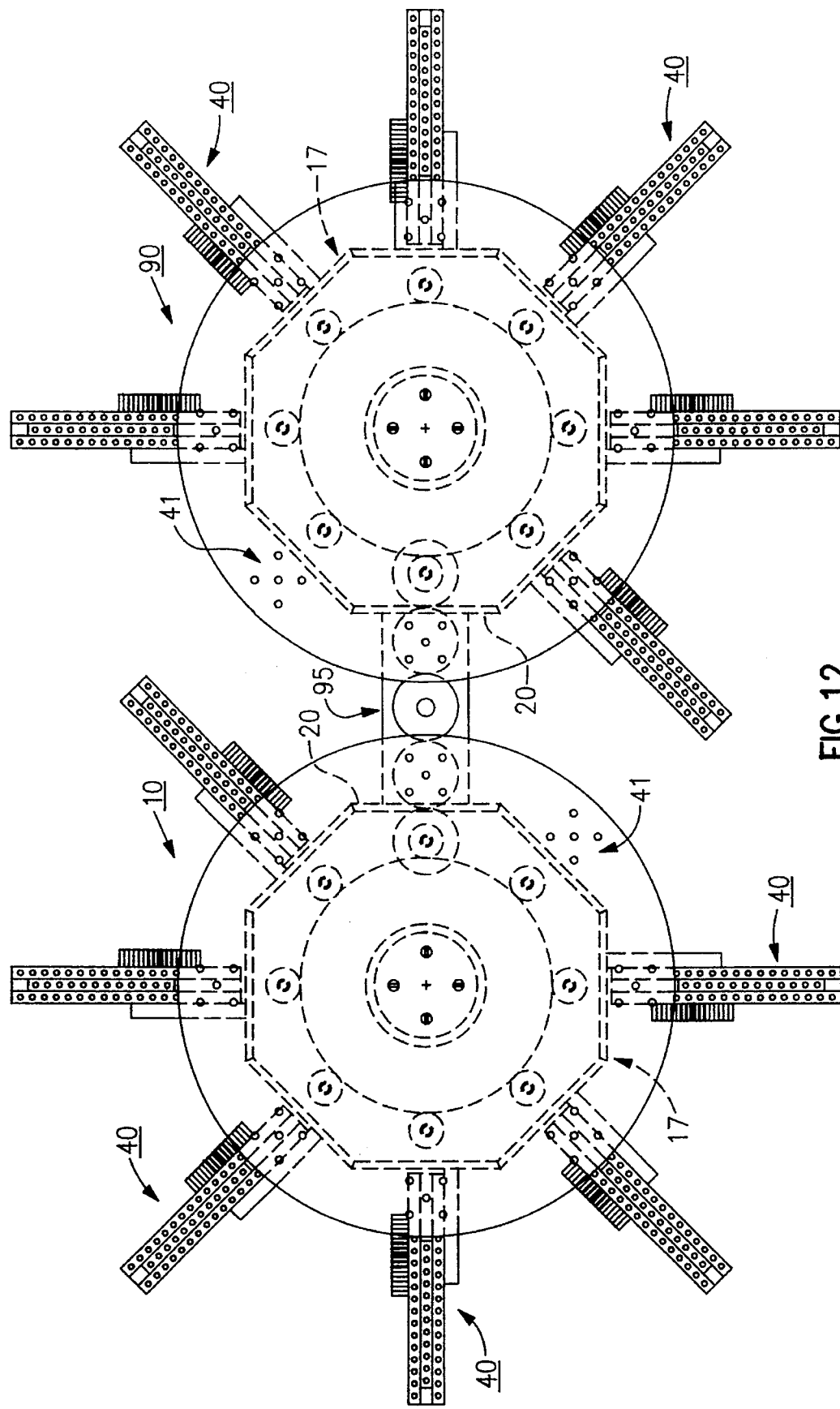
FIG. 12 is a top view shown in two modular units embodying the teachings of the present invention connected together so that the modular units can be driven from a single prime mover.
Figure 13:
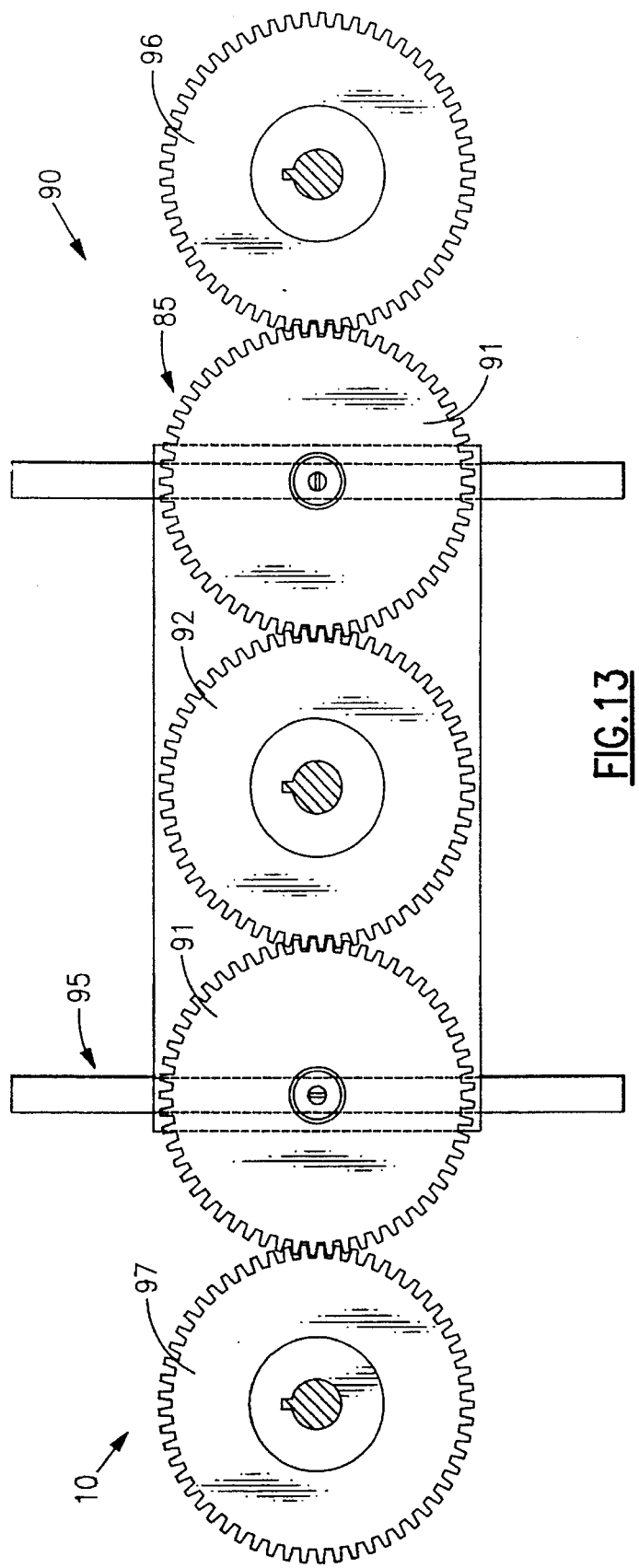
FIG. 13 is a partial enlarged top view showing a gear train used to connect the two modular units in assembly.
Figure 14:
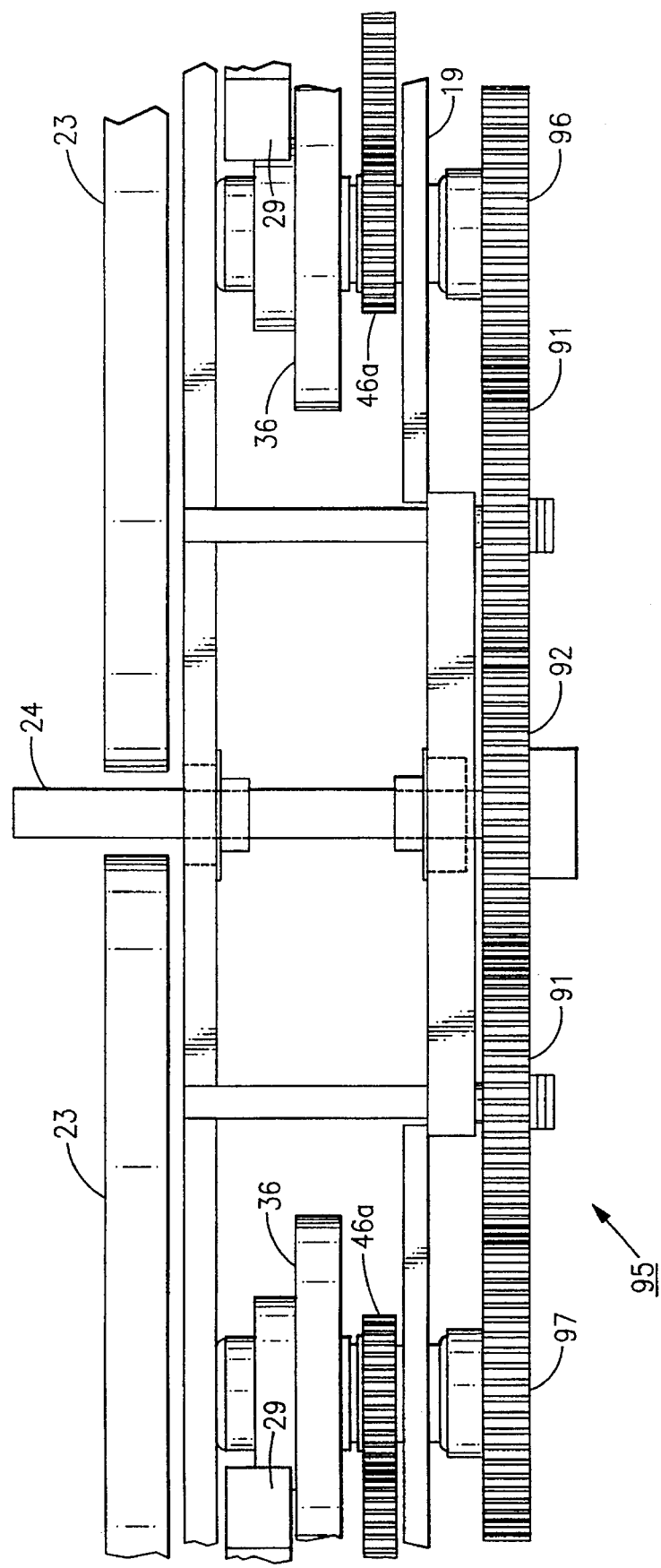
FIG. 14 is a side view of the gear train shown in FIG. 13.

Turning now to FIGS. 12–14, there is shown two modular units 10 and 90 that are cojoined by a power take off unit 95 so that the two units may be powered by a single prime mover which, in this embodiment, is motor 30 contained in the first unit 10. The modules are mounted in a side by side relation as shown in FIG. 12 with the loading and unloading stations 41—41 mounted on either side of a power take-off unit. A power take off gear 97 is pinned to one of the secondary gear shafts in unit 10 and is arranged to drive a similar secondary gear 96 mounted in the other modular unit via a pair of idler gears 91—91 and a motor reversing gear 92. The power gear train shafts are supported within the power take-off unit 95 upon support plates. The gear train provides a 1:1 speed ratio between the coupled secondary gears whereby the primary and secondary gears in one unit turn at the same speed as those in the other unit. Although two modular units are shown cojoined in this further embodiment of the present invention, it should be evident to one skilled in the art that more modular units may be similarly connected without departing from the teachings of the present invention.

While this invention has been explained with reference to the structure disclosed herein, it is not confined to the details set forth and this invention is intended to cover any modifications and changes as may come within the scope of the following claims.

I claim:

1. Apparatus for carrying out a series of operations upon a workpiece that includes a first modular unit that further contains, a frame, a worktable mounted for rotations above said frame, said worktable having at least one hold-down station thereon for supporting a workpiece, a Geneva wheel mounted in said frame for rotation with said worktable to intermittently move the worktable and periodically indexing the hold-down station into a series of work stations positioned about the worktable whereby the hold-down means is held in each work station for a predetermined dwell period, a primary gear mounted for rotation in said frame and being in meshing engagement with a series of smaller secondary gears, a prime mover for turning the primary gear at a desired rate, a Geneva driver connected to one of said secondary gears for engaging said Geneva wheel and indexing the Geneva in timed relation with movement of the primary gear, and coupling means for operatively connecting one of said secondary gears to a movable tool support located in each of the work stations for reciprocating the tool support toward and away from a hold-down means positioned in the work station whereby an operation can be performed on a workpiece support in the hold down during each dwell period.

2. The apparatus of claim 1 wherein said coupling means includes a slide member for supporting a tool and a stationary support housing having a means for guiding the slide member along a reciprocal path of travel.

3. The apparatus of claim 2 wherein said coupling means further includes a four bar linkage for connecting said prime mover to said tool support slide member.

4. The apparatus of claim 3 wherein said four bar linkage includes a rack means slidably mounted for reciprocal movement upon rail means and a pinion mounted upon a stationary pinion shaft in meshing engagement with said rack and gear means also connected to said stationary shaft for driving said slide along said guideway.

5. The apparatus of claim 4 wherein said stationary support housing is rotatably supported upon said stationary pinion shaft whereby said stationary support housing can be angularly positioned with regard to said worktable.

6. The apparatus of claim 2 wherein said coupling means further includes a cam and cam follower for connecting said prime mover to said tool support.

7. The apparatus of claim 1 wherein there is a plurality of hold down stations at least equal in number to the number of said work stations.

8. The apparatus of claim 1 wherein said prime mover is a motor.

9. The apparatus of claim 1 that further includes at least one other modular unit that lacks a prime mover and a power take off means for connecting the primary gear of the second unit to the prime mover of said first unit.

10. The apparatus of clam 9 wherein said gear train is arranged to connect a secondary gear attached to the prime mover in the first unit to a secondary gear in said second unit.

11. The apparatus of claim 10 wherein the gear train provides a 1 to 1 speed ratio whereby the secondary gear in the first unit turns the same speed as the secondary gear in the second unit.

* * * * *